Patented June 4, 1929.

1,716,286

UNITED STATES PATENT OFFICE.

THEODORE B. WAGNER, OF BROOKLYN, NEW YORK.

ORGANIC PHOSPHATE AND PROCESS OF MAKING SAME.

No Drawing.     Application filed November 10, 1927. Serial No. 232,471.

The present invention has for its object the production, from the steepwater of corn, of a therapeutically valuable compound the major portion of which consists of an insoluble salt of organic phosphoric acid containing practically but a single base; the steepwater is obtained as a by-product in the manufacture of starch and glucose from Indian corn.

I am aware that in U. S. Patents #914,379 and #920,108 processes for the treatment of steepwater with basic substances are described which yield insoluble precipitates. These processes, however, and the products resulting therefrom are different from the process I employ and from the product which I obtain by my process, as will be more specifically pointed out in the following description.

Extended investigations have shown that the major part of the nitrogen content of steepwater is present in the form of amino acids and, to a much smaller extent, in the form of coagulated protein and/or such proteins as are coagulated on heating the steepwater. These may be removed, if desired, by filtering the hot steepwater, such filtration being rendered more effective by the addition of a suitable filtering medium, kieselguhr for instance.

The relatively large quantity of phosphoric acid present in the steepwater exists in two forms, namely, as acid salts of phosphoric acid and, preponderantly, as acid salts of organic phosphoric acid. By carrying the addition of lime to the neutral point, or very near to it, all of the organic phosphoric acid is precipitated in the form of insoluble calcium salts, while the amino acids remain in solution. Due to the fact that the calcium salts are those of the least solubility, lime replaces the magnesia, which is naturally present in the steepwater; this magnesia content is easily five times as large as that of the naturally present lime.

When the process of U. S. Patent #914,379 is followed which calls for the addition of ammonia in quantities sufficient to render the mixture alkaline, lime and magnesia, as naturally present in steepwater, enter into the precipitate, in addition to the ammonia itself, producing a compound sharply distinguished from mine.

The process described in U. S. Patent #920,108 calls for a partial neutralization of the steepwater and when lime is used as a neutralizing agent, which, however, is not mandatory, a precipitate is formed which contains lime and magnesia, but little organic phosphate, the balance remaining in solution as described in the specification beginning on line #86, page 2.

The difference between this compound and mine becomes obvious when the amounts of lime are considered, which are used in the respective processes. Comparing the amount of lime called for by U. S. Patent #920,108 and the quantity used by me as stated hereinafter, it will be noted that only 26 pounds of lime are used in the former per 1000 pounds of dry substance steepwater, whereas, in my process 60 pounds are used per 1000 pounds dry substance steepwater.

I use as my raw material the light or the heavy steepwater, whichever is more readily available, filter hot, when aiming at freedom from protein, add slaked lime preferably in the form of milk of lime in sufficient quantity to reduce the acidity to zero or nearly so, and then collect, wash and dry the resulting precipitate. The following is a practical illustration of my preferred procedure:

To obtain about 1000 lbs. of my organic phosphate, I take about 2200 gallons of "heavy" steepwater usually having a density corresponding to 24° Beaumé, reduce it to 18° Beaumé by the addition of water, and then add sufficient lime to render the solution neutral, or nearly so. Before adding the lime to the steepwater, I work it into a milk by adding water, usually in the ratio of 50 lbs. of lime to 50 gallons of water. I use about 450 lbs. of lime in the treatment of the above mentioned 2200 gallons of concentrated or "heavy" steepwater. I add the milk of lime gradually and under vigorous agitation of the mixture and exercise particular care in adding the milk of lime the more slowly the more closely the neutral point is approached, testing the batch frequently with litmus paper.

After sufficient milk of lime has been added to render the mixture neutral or leave it faintly acid, I heat it to 180° F. under constant agitation and then proceed to collect the precipitate, preferably in a filter press, to wash it thoroughly with water either in the press or after dropping it into a vat, and finally to dry it in a suitable apparatus until the moisture content has been reduced approximately to 10%.

After drying my new compound constitutes a light greyish or white powder, the major portion of which is an insoluble calcium salt of organic phosphoric acid, and inosite phosphoric acid probably represents the major portion thereof; the relation of the latter to inosite is probably expressed in the following structural formulæ:

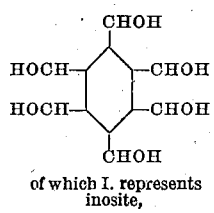
of which I. represents inosite,

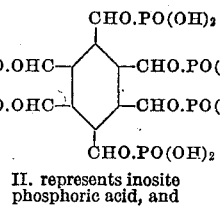
II. represents inosite phosphoric acid, and

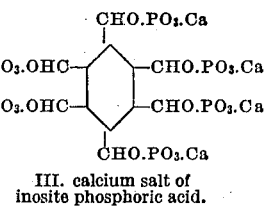
III. calcium salt of inosite phosphoric acid.

If the protein has not been removed by previous filtration, my product may contain about 10% of protein substances, not in chemical combination, however, with either the lime or the phosphate. If filtration of the steepwater is had, the protein content of the precipitate becomes negligible.

I claim:

1. The process of substantially neutralizing steepwater, obtained from corn, with slaked lime and collecting the resultant precipitate.

2. As a new article of manufacture a compound the major portion of which consists of an insoluble lime salt of organic phosphoric acid and which is derived from the steepwater of corn by the addition thereto of slaked lime.

THEODORE B. WAGNER.